Jan. 9, 1962   L. M. ILGENFRITZ ETAL   3,016,514
APPARATUS FOR FIELD TESTING SIGNAL GUIDED BODIES
Filed Feb. 10, 1944
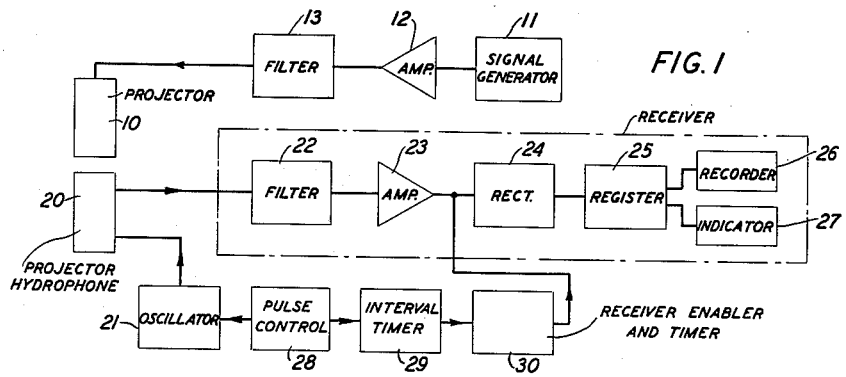
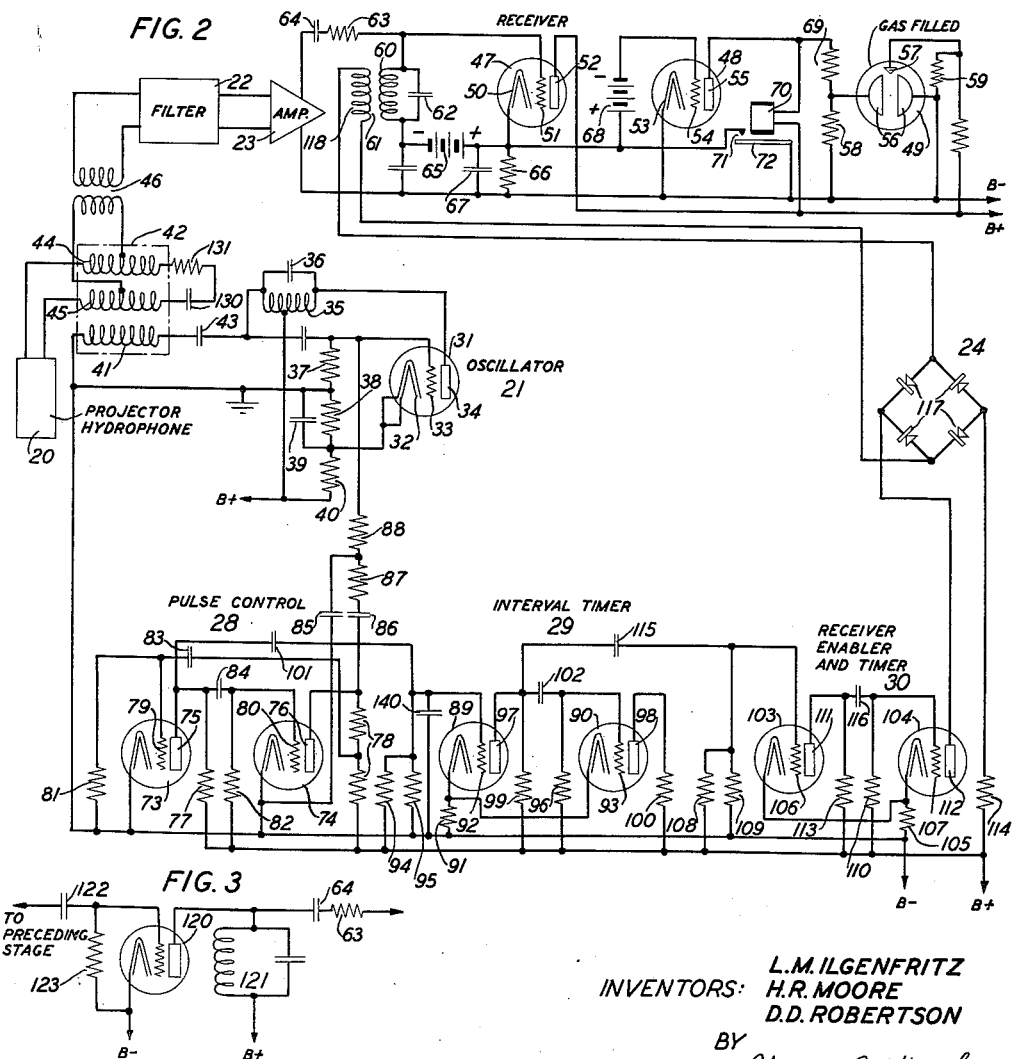
INVENTORS: L. M. ILGENFRITZ
H. R. MOORE
D. D. ROBERTSON
BY Walter C. Kiesel
ATTORNEY United States Patent Office 3,016,514
Patented Jan. 9, 1962

3,016,514
APPARATUS FOR FIELD TESTING SIGNAL GUIDED BODIES
Lester M. Ilgenfritz, Larchmont, N.Y., Hilbert R. Moore, Pluckemin, N.J., and Donald D. Robertson, Hartsdale, N.Y., assignors to Bell Telephone Laboratories, Incorporated, New York, N.Y., a corporation of New York
Filed Feb. 10, 1944, Ser. No. 521,778
13 Claims. (Cl. 340—3)

This invention relates to apparatus for field testing signal guided bodies and more particularly to submarine echo ranging systems for use in the field testing of sonically guided torpedoes such as disclosed, for example, in the application Serial No. 491,796, filed June 22, 1943.

In a torpedo of the type disclosed in the application above identified, the rudder and elevator are controlled in accordance with signals emanating from a target, for example random noise signals emanating from a submarine, and detected by hydrophones mounted on the torpedo to steer the torpedo to and against the target. Because of the many factors entering into the operation of the steering control systems in such torpedoes and into the motional behavior of the torpedoes in response to target signals, it is eminently desirable that the operating performance of such systems and of the torpedoes be determined and checked before delivery of the torpedoes for combat use.

One object of this invention is to facilitate the field testing of moving bodies having signal controlled steering systems. More specifically, one object of this invention is to obtain information indicative of the performance of a signal guided torpedo and more particularly of the motional behavior of the torpedo in the vicinity of a target.

In one illustrative apparatus embodying this invention a target is provided toward which the torpedo, with the explosive charge normally carried thereby removed, is launched. The target comprises a submarine signal projector, which may have a substantially non-directional propagating characteristic, and means for energizing the projector so that it propagates submarine signals simulating those likely to be produced by an actual target and to which the steering system is designed to be responsive. The apparatus comprises also an echo ranging system including a submarine signal translating device at the target, a receiving circuit associated with the translating device, and means, such as an oscillator, for energizing the device as a projector. Control and timer elements are associated with the receiving circuit and the oscillator so that the translating device is operated alternately at a prescribed frequency and for periods of prescribed duration, as a projector and as a receiver. The control and timer arrangements are such that when the torpedo enters within an area of prescribed radius about the target, echoes of the signal projected by the translating device are received by the device and corresponding signals are supplied to the receiving circuit. As the torpedo moves in the area such echoes are received periodically. Recording or indicating elements or both are provided in the receiving circuit to indicate the reception of the echoes.

The invention and the several features thereof will be understood more clearly and fully from the following detailed description with reference to the accompanying drawing in which:

FIG. 1 is a block diagram of apparatus for field testing signal guided torpedoes, constructed in accordance with this invention;

FIG. 2 is a circuit diagram of the echo ranging system included in the apparatus illustrated in FIG. 1; and FIG. 3 is a detail view of a portion of the amplifier included in the system shown in FIG. 2.

Referring now to the drawing, the apparatus illustrated in FIG. 1 comprises a submarine signal projector 10 having a substantially non-directional propagating characteristic, that is, it radiates or propagates signals of substantially uniform intensity in all directions. The projector 10 is energized by a signal generator 11, which may be, for example, a gaseous discharge device type of oscillation generator, the output of which simulates the random noise emanating from an actual target such as a submarine. The generator is designed to be most efficient at the frequency to which the steering system of the torpedo under test is most responsive. The output voltage of the signal generator 11 is amplified by a suitable amplifier 12 and then supplied to the projector 10 by way of a filter 13. The latter is designed to restrict the output of the projector 10 to a prescribed band of frequencies dependent upon the range for which the torpedo under test is designed to operate and the operating frequency of the echo ranging system, so that the projector propagates signals similar to those which the torpedo may encounter in combat use and interference between the projector 10 and the echo ranging system is prevented. For example, the torpedo under test may be designed so that the steering system therefor is operated by signals of a frequency of the order of 24 kilocycles per second and the operating frequency of the echo ranging system may be of the order of 56 kilocycles per second. Advantageously, then, the generator 11 is broadly resonant at about 24 kilocycles and the filter 13 is of the low-pass type having a fairly sharp cut-off at of the order of 30 kilocycles.

The projector 10 may be suspended by a suitable cable, not shown, from a buoy and submerged to a desired depth, and constitutes a sound source representative of an actual target, toward which the torpedo is launched in a trial run. The signal generator, amplifier and filter may be mounted in a boat or upon a float and associated with the projector 10 by way of the cable.

The echo ranging system comprises a submarine signaling device 20 which may be mounted adjacent the projector 10 and similarly to the projector 10, has a substantially non-directional response characteristic. The signaling device 20 is utilized as both a projector and a hydrophone, as will be described in detail hereinafter, and is designed to be particularly efficient at a preassigned frequency, e.g. 56 kilocycles per second. It is energized as a projector by a suitable generator 21, such as an electronic oscillator, tuned to a frequency considerably higher than the highest frequency propagated by the projector 10 and designed to supply the device 20 with signals of a narrow band of frequencies. For example, if the filter 13, as noted hereinabove, has a sharp cut-off at about 30 kilocycles, and offers very high attenuation to frequencies well above 30 kilocycles and in particular to frequencies of approximately 56 kilocycles, substantial radiation from the signaling device 10 is effectively eliminated in the band of frequencies employed by device 20 which may be, for example, from 55 to 58 kilocycles.

Associated with the signaling device 20 is a highly sensitive receiver which comprises a filter 22, an amplifier 23, a rectifier 24, a register 25 and indicating elements such as a recorder 26 or an indicator 27 or both. The filter 22 provides a high loss for frequencies in the range propagated by the projector 10 so that the receiving circuit is substantially isolated from the projector 10. In apparatus wherein the operating frequencies for the projector 10 and echo ranging system are of the values given heretofore, the filter 22 may be of the high-pass type and have a cut-off at about 50 kilocycles per second.

The register 25 is responsive to each signal pulse received by the receiving circuit when the signal device 20 is operating as a detector and controls the operation of the recorder 26 and indicator 27. The recorder may comprise a magnetically operated stylus or counter controlled by the register 25 to provide a record of pulses received and the indicator may be, for example, a glow discharge device which is energized in response to each signal pulse received by the receiver to provide a visual indication of such pulses.

The echo ranging system includes also a pulse control 28, interval timer 29 and receiver enabler and timer 30 which in combination effect operation of the signaling device 20 as a projector and hydrophone alternately at preassigned intervals and at a prescribed frequency and determine the duration of each period of transmission and reception by the device 20. The principles involved in the operation of the parts will be understood from the following consideration.

When the signaling device 20 is energized by the oscillator 21 it propagates signals of substantially uniform intensity in all directions. If there is within the field of the device 20 an object, such as a torpedo, having substantially different characteristics of wave transmission than sea water, reflections or echoes will be produced and these will arrive at the device 20. The time of arrival of such reflections or echoes with respect to the time of the propagation of the corresponding signal wave by the device 20 will be dependent upon the distance of the object, i.e. torpedo, from the device 20. As the torpedo approaches the device 20, a series of echoes is produced so that if the device 20 is operated alternately as a projector and a hydrophone and the alternate operation is of correct frequency and timing, a series of signals corresponding to the echoes will be supplied to the receiving circuit and indicia of the echoes and, hence, of the action of the torepdo within a prescribed distance of the device 20 will be obtained.

Supersonic compressional wave signals have a velocity in sea water of approximately 5000 feet a second or 5 feet per millisecond. Considering the total time requisite for a signal propagated by the device 20 to travel to the torpedo and for the corresponding echo to travel from the torpedo to the device 20, a millisecond corresponds to a distance of 2.5 feet between the torpedo and the device. Thus, a distance of 15 feet between the torpedo and the device requires a time of 6 milliseconds between the propagation of a signal pulse by the device 20 and the arrival of the corresponding echo at the device 20.

The oscillator 21 may be controlled by the pulse control 28 so that the signaling device 20 is energized, for example at 56 kilocycles per second, for 1 millisecond. In order to prevent false indications due to detection of the end portion of the propagated pulse by the device 20, the receiver circuit may be enabled, by the enabler and timer 30, only after the elapse of an interval, for example of 3 milliseconds duration, after the cessation of the 1 millisecond period during which the device 20 is energized as a projector. The receiver circuit may remain enabled for a period, for example of 3 milliseconds duration. At the end of this period, the receiver is disabled, for example for 93 milliseconds, after which the device 20 is again energized for 1 millisecond to propagate another signal pulse. The complete cycle of operation, then, is of 100 milliseconds' duration.

For the specific figures given above, it will be seen that any echo received at the device 20, when the device is operating as a hydrophone, within 3 to 6 milliseconds after the propagation of a signal pulse by the device 20 operating as a projector will produce an echo signal in the receiver circuit. Such echo signals will be produced whenever the torpedo is within a radius of 15 feet of the target. If the speed of the torpedo is 20 feet per second, an echo will be received for each 2 feet of progress of the torpedo in the area within the radii of 15 feet and 7½ feet of the target. When the torpedo is at a distance of greater than 15 feet from the target, no echo signals will be produced in the receiver circuit.

Referring now to FIG. 2, the oscillator 21 comprises an electron discharge device 31, which includes a cathode 32, for example of the indirectly heated type as illustrated, a control grid 33 and an anode 34, the oscillating circuit for the device comprising the parallel inductance-condenser combination 35, 36 tuned to the desired operating frequency, e.g. 56 kilocycles per second. The grid circuit for the device 31 includes the resistor 37 to ground. The cathode is held at a positive potential with respect to ground by the potential divider circuit consisting of resistors 38 and 40 in series across the anode voltage source by way of connection B+. Since the cathode 32 is connected to the junction of resistors 38 and 40 its potential is determined by the ratio of their resistances when no cathode current is being drawn. This ratio is so proportioned that the ground and hence the grid through resistor 37 is held at a sufficiently negative potential with respect to the cathode 32 that the space current of the device 31 is completely blocked and it will not oscillate. The anode voltage is supplied by a source, not shown, by way of the connection B+ indicated in FIG. 2. The condenser 39 is connected across the cathode resistor 38 to hold the bias voltage nearly constant during the relatively short intervals in which the device 31 is operative. The oscillating circuit is connected to the signaling device 20 by way of the winding 41 of the hybrid coil 42 and a blocking condenser 43, for example of 0.1 microfarad capacity.

The receiver is coupled to the windings 44 and 45 of the coil 42 by way of a transformer 46 to preserve balance between the receiver and the device 20, one winding of the transformer being connected to the filter 22 as shown. Associated with the windings 44 and 45 are a condenser 130 and a resistance 131 which serve to balance the impedance of the projector hydrophone 20 at frequencies around 56 kilocycles per second so that the loss afforded by the hybrid coil from the transmitting to the receiving circuit is high. As noted heretofore, the filter provides a high loss at those frequencies within the band propagated by the projector 10. To further isolate the receiver circuit from the projector 10, the several stages of the amplifier 23 are tuned to the operating frequency, e.g. 56 kilocycles, of the echo ranging system.

In a particularly advantageous construction, the amplifier 23 is provided with a time variation of gain control as illustrated in FIG. 3. The last stage of the amplifier 23 comprises an electron discharge device 120 of the remote cut-off type, such as a device designated commercially as 6SK7. The device 120 hs a tuned plate circuit 121 and the input circuit thereof includes a condenser 122 and a leak resistor 123, for example of 0.02 microfarad and 0.1 megohm respectively. During the transmitting pulse interval, the receiving circuit is loaded sufficiently to place a large negative charge upon the condenser 122. This charge leaks off through the resistor 123, the capacitance of the condenser being such that its discharge rate through the resistor 123 is such as to restore the gain of the device 120, during the period in which the receiver is enabled, at substantially the rate at which the energy of the echo varies with twice the distance from the projector to the object, e.g. torpedo. A particular advantage of this construction is that more gain can be employed in the receiving circuit without danger of false records due to reverberation in the projector hydrophone.

The register comprises two triodes 47 and 48, which may be parts of a twin triode electron discharge device such as a 6F8G vacuum tube, and a cold cathode gaseous discharge device 49. The elements of the triodes are as identified in the drawing by the reference numerals 50 to 55, inclusive. The gaseous discharge device 49 comprises similar cold cathodes 56 and an anode 57 which are biased from the B supply, connection to which is indicated by the lead B+ in the upper right-hand part of FIG. 2, by way of a potential divider arrangement defined by resistors 58 and 59, the biases being such that normally the device 49 is non-conducting but will become conducting in response to small potentials applied to the left-hand electrode 56.

The input circuit of the triode 47 includes the primary winding 60 of the transformer 61, the winding being shunted by a condenser 62 of appropriate capacity to tune the input circuit to the operating frequency, e.g. 56 kilocycles per second. The output of the amplifier 23 is supplied to the input circuit of he device 47 by way of a high resistance 63, for example of the order of 0.25 megohm, and a suitable blocking condenser 64. The control grid 51 is biased negatively by a suitable source such as a battery 65, the bias being such that in the absence of a signal supplied by the amplifier 23, no plate current flows in the anode circuit of the device 47. Connected in the cathode circuit of the device 47 is a resistor 66, for example of the order of 5 megohms, shunted by a condenser 67, for example of 0.05 microfarad capacity, the funciton of which will be pointed out hereinafter.

The control grid 54 of the triode 48 is connected to the cathode circuit of the triode 47 and is biased negatively, as by a battery 68, at a potential such that normally no current flows to he anode 55. The anode 55 is connected to the lefthand electrode 56 of the gaseous discharge device 49 by way of a suitable resistance 69. The anode circuit of the triode 48 includes a relay 70, the contact 71 of which is normally open and the contact and armature 72 of which are connected to respective terminals of the condenser 67.

Each of the pulse control 28, interval timer 29 and receiver enabler and timer 30 comprises a pair of similar triodes, the triodes of each pair being, for example, elements of twin triode electron discharge devices such as 6SL7GT radio tubes. The triodes 73 and 74 of the pulse control 28 are associated with appropriate circuit elements to define a pulsing type of trigger circuit serving to render the oscillator 21 operative at a prescribed frequency, e.g. at 100-millisecond intervals as noted heretofore. The anodes 75 and 76, respectively, of the triodes 73 and 74 are biased from the B supply through suitable high resistors 77 and 78, for example of 0.1 megohm in each element, and the control grids 79 and 80 are biased by way of resistors 81 and 82, respectively, the resistor 81 being, for example, of the order of 0.8 megohm and the resistor 82 of the order of 0.5 megohm. The grid 79 is connected to the anode circuit of the device 74 through a moderately large, e.g. 0.25 microfarad, condenser 83 and a connection including a small, e.g. 0.002 microfarad, condenser 84 is provided between the grid 80 and anode 75. Bridged across the anode circuit of the device 74 is a circuit including a blocking condenser 86, for example of 0.25 microfarad and a resistor 87, for example of the order of 0.25 megohm, which circuit has connection to the grid 33 of the oscillator device 31 by way of a suitable resistance 88, which may be of the order of 0.25 megohm. Condenser 85, for example of 100 micro-microfarads, is shunted from the junction of resistors 87 and 88 to ground thus serving to by-pass frequency oscillations and transients.

The cathode circuits for the triodes 89 and 90 of the interval timer 29 include a common moderately large resistor 91, for example of the order of 27,000 ohms. Bias for the control grids 92 and 93 is supplied through resistors 94, 95 and 96, connected as shown, which may be of the order of 1, 0.15 and .92 megohms, respectively. A condenser 140, for example of 0.0015 microfarad, is connected to the grid 92 and serves to remove transient voltages from the pulse control circuit into the oscillator circuit during the periods when the oscillator is intended to be disabled. Plate potential for the anodes 97 and 98 may be applied by way of resistors 99 and 100, respectively, each of which may be of the order of 0.1 megohm. The control grid 92 of the triode 89 is connected to the anode circuit of the triode 73 through a small, for example 500 micro-microfarads, condenser 101 and the control grid 93 of the triode 90 is coupled to the anode 97 of the triode 89 through a condenser 102 of, for example 0.01 microfarad capacity.

The cathode circuits of the triodes 103 and 104 of the receiver enabler and timer 30, similarly to those of the triodes 89 and 90, include a common resistor 105, for example of the order of 27,000 ohms, and the grids 106 and 107 may be biased through circuits comprising resistances 108, 109 and 110 which may be of the order of 1, 0.15 and 0.75 megohm, respectively. Plate potential for the anodes 111 and 112 is supplied through resistors 113 and 114 each of the order of 0.1 megohm. The control grid 106 is connected to the anode 97 of the triode 89 through a condenser 115, for example of 100 micro-microfarads, and the control grid 107 is connected to the anode 111 through a condenser 116, for example of the order of 0.02 microfarad.

The rectifier 24 is in the form of a bridge composed of four similar rectifier elements 117, for example of the dry disc type, poled as shown. One pair of complementary terminals of the bridge is connected in series relation in the anode circuit of the triode 104; the two other terminals are connected to the secondary winding 118 of the transformer 61 in the receiver circuit. It will be appreciated that when plate current flows in the anode circuit of the triode 104, the impedance of the bridge rectifier 24 is small and that, therefore, the secondary winding 118 is effectively short-circuited. Thus, the primary winding 60 presents small impedance to the output of the amplifier 23 as compared with resistance 63. When, however, the plate current of the triode 104 is zero, the impedance of the bridge 24 is high and the effective short-circuit to ground from the grid of triode 47 is removed.

The operation of the echo ranging system illustrated in FIG. 2 will be understood from the following discussion. Assume as a starting point in time that the control grid 79 of the triode 73 is highly negative, due to the charging of the condenser 83 through the resistance 78. At this time, the grid 33 of the oscillator device 31 is negative as noted heretofore, so that the oscillator 21 is inoperative, and the grid 80 is positive and the triode 74, thus, conductive. The charge upon the condenser 83 then discharges through the resistance 81, which is effectively in parallel relation therewith.

When the grid 79 is highly negative, the anode circuit of the device 73 is essentially open. However, as the negative charge upon the grid 79 due to the condenser 83 is dissipated through the resistance 81, the anode circuit closes through the low anode-cathode resistance. As the plate resistance of the triode 73 decreases, the grid 80 of the triode 74 receives a negative charge through the condenser 84 and the anode circuit of the triode 74 opens whereby the potential of the anode 76 rises to a high value. Consequently, an increasing positive potential is supplied to the grid 33 of the oscillator device 31 so that the normal negative blocking bias upon the grid 33 is overcome and the oscillator is rendered operative to supply a 56-kilocycle pulse to the projector hydrophone 20. The negative charge upon the condenser 84 is dissipated through the resistance 82, the time of discharge being determined, of course, largely by the constants of the resistance 82 and condenser 84. For the values given hereinabove, the discharge period is substantially 1 millisecond. When the charge noted has been dissipated, the control grid 80 again becomes positive and the potential of anode 76 decreases. When the potential of anode 76 decreases, the normal negative bias upon the grid 33 becomes controlling and the device 31 ceases oscillating. Also a negative charge is placed upon the condenser 83, so that the cycle is completed. The over-all pulsing period, it will be apparent, is determined largely by the constants of the resistance-condenser combination 81, 83 and of the constants of the resistance-condenser combination 82, 84. The correlation of the several constants involved to produce an over-all pulsing period of any desired length is understood by those skilled in the art. For the particular values of resistance and capacity given hereinabove, the overall pulsing period is substantially 100 milliseconds and a pulse of substantially 1 millisecond duration is produced, as noted previously.

At the initiation of the pulsing cycle, the grid 93 of the device 90 is positive and plate current flows in the anode circuit of the triode 90 of the interval timer 29 and a large potential difference appears across the common cathode resistor 91. Hence, at the time noted, the grid 92 of the device 89 is negative and the plate circuit of this device is effectively open. When the potential of the anode 75 of the device 73 decreases, as described heretofore, a negative charge is impressed upon the grid 92 by way of the small condenser 101. This charge has no effect upon the triode 89 because of the negative bias already upon the grid 92 thereof. However, when the potential of the anode 75 rises, which occurs at the end of the transmitting pulse supplied to the projector hydrophone 20 as described heretofore, a positive charge is supplied to the grid 92 by way of the condenser 101 and the triode 89 is rendered conductive. Consequently, the plate resistance of the triode 89 falls and a negative charge is supplied to the grid 93 by way of the condenser 102. As a result, the triode 90 is rendered non-conductive and the potential drop across the resistor 91 falls off and the triode 89 passes current. The triode 89 remains conductive and the device 90 remains non-conducting until the charge upon the condenser 102 leaks off through the resistance 96. The time interval involved in the discharge of the condenser 102 will be determined, of course, largely by the constants of the resistance-condenser combination 96, 102. At the end of this interval, the grid 93 becomes positive, current flows in the anode circuit of the triode 90, whereby the drop across the resistor 91 increases and the grid 92 becomes negative to block the device 89. This cycle is repeated for each transmitting pulse, the duration being determined by the resistance 96—condenser 102 combination. For the resistance and capacitance values given hereinabove the length of this period is substantially 3 milliseconds. At the end of each cycle, the potential of the anode 97 increases so that a positive impulse is passed to the grid 106 of the triode 103 by way of the condenser 115.

Normally the grid 107 of the triode 104 is positive, plate current flows in the anode circuit of this triode and a potential drop is established across the resistor 105 whereby the grid 106 of the device 103 is biased negatively. The positive impulse supplied to the grid 106 by way of the condenser 115 at the time noted above, removes the blocking bias on this grid so that the plate resistance of the triode 103 decreases and a negative charge is supplied to the grid 107 of the device 104 by way of the condenser 116. This charge overcomes the positive bias upon the grid 107 and the triode 104 is rendered non-conducting whereby the negative bias upon the grid 106 due to the drop across the resistor 105 is removed. The device 103 remains conducting and the device 104 non-conducting until the charge upon the condenser 116 passes off through the resistor 110. When this charge has leaked off, the triode 104 becomes conducting so that a negative blocking bias is impressed upon the grid 106 and the triode 103 becomes non-conducting, remaining so until another positive charge is received by the grid 106 by way of the condenser 115. The duration of the period in which the triode 104 is non-conducting is determined largely by the constants of the resistance-condenser combination 110, 116. For the resistance and capacitance values given hereinabove, the length of this period is substantially 3 milliseconds.

To recapitulate, the pulse control 28 effects operation of the oscillator 21 for a prescribed duration, e.g. 1 millisecond, at definite periodicity, e.g. 100 milliseconds, the duration being determined by resistance 82 and condenser 84 and the periodicity mainly by the resistance 81 and condenser 83 whereby pulses, e.g. of 56 kilocycles frequency, are propagated periodically, e.g. 10 times per second, by the signaling device 20. At a prescribed interval, e.g. 3 milliseconds, after each pulse, determined by the interval timer 29 and more particularly by the resistance 96 and condenser 102, the triode 104 of the receiver enabler and timer is rendered non-conducting for a preassigned period, e.g. 3 milliseconds, determined by the resistance 110 and condenser 116.

As noted heretofore, when the triode 104 is conducting, the rectifier 24 effectively short-circuits the winding 118 of the transformer 61, so that the winding 60 of this transformer presents a low impedance to the amplifier and the output voltage appears across the resistor 63. Consequently, the device 47, which is normally blocked by the grid bias due to the source 65, remains in non-operating condition. However, when the triode 104 is rendered non-conducting, in the manner described heretofore, the impedance of the bridge 24 is high and the short-circuit across the winding 118 is removed. Hence, a signal voltage is supplied to the grid 51 by the amplifier 23. When a voltage is thus impressed upon the grid 51 by the amplifier in response to an echo detected by the signaling device 20, the condenser 67 receives a charge which is held by the condenser for an appreciable time.

As the condenser 67 becomes charged, the potential of the grid 54 of the device 48 becomes less negative by virtue of the inclusion of the condenser in the grid circuit of the device 48. Consequently, current flows in the anode circuit of the device 48 and the relay winding 70 is energized to close the contact between 71 and 72. When this occurs, a short-circuit is placed across the condenser 67 and the condenser is discharged so that the device 48 again becomes non-conducting and the armature 72 is released. The receiver circuit, therefore, responds to echo signal pulses, which are of short duration, the condenser 67 holding its charge sufficiently long to allow the armature 72 to be moved into engagement with the contact 71.

The relay 70, 71, 72, thus, serves to register the reception of an echo detected by the signaling device 20 during the period when the receiver is operating, that is during the time when the winding 118 is not short-circuited by the rectifier bridge 24. The armature 72 will be moved in response to each echo received during this period and may have associated therewith the actuating element of a recorded or counter for producing a record of the number of echoes received while the torpedo is within the prescribed radius, e.g. 15 feet, of the test target.

The gaseous discharge device 49 serves to provide a visual indication of the reception of an echo or echoes by the signaling device 20. As noted heretofore, the potentials supplied to the electrodes of the device 49 are such that normally this device is in non-conducting condition. When the register device 48 is rendered conductive, the potential between the electrodes 56 is raised, due to the drop appearing across the resistance 58 connected to the anode circuit of the device 48, and a discharge is initiated to the anode 57 whereby a visible glow signal is produced. The device 49 remains conductive until the anode circuit thereof is opened, as by a key or switch, not shown, included in this circuit.

The gaseous discharge device serves to indicate that at least one echo has been received and the recorder or counter provides information as to the number of echoes received while the torpedo is within the field of the echo ranging system.

Although a specific embodiment of this invention has been shown and described, it will be understood that it is but illustrative and that various modifications may be made therein without departing from the scope and spirit of this invention as defined in the appended claims.

What is claimed is:

1. A submarine echo ranging system for indicating the motional behavior of a moving body of known speed within a limited area about a reference point, said system comprising a submarine signaling device operable as both a projector and a hydrophone, an oscillator coupled to said device, a normally disabled receiver coupled to said device, control means for said oscillator effective to produce energization of said device by said oscillator for periods of preassigned duration and at intervals small in comparison to the time required for said body to traverse a substantial part of said area, a first timer means for enabling said receiver for periods of preassigned duration, and a second timer means controlled by said oscillator control means for effecting operation of said first timer means at a predetermined interval after each period of energization of said device by said oscillator, said predetermined interval being short in comparison to the interval between successive energization periods of said device and the duration of the periods in which said receiver is enabled being long in comparison to the length of said energization periods.

2. A submarine echo ranging system in accordance with claim 1 wherein said receiver comprises a register, and means for operating said register in response to each signal pulse detected by said device during the periods in which the receiver is enabled.

3. An echo ranging system comprising means including a signal generating element for propagating time spaced signal pulses of prescribed duration, control means determining the periodicity and duration of operation of said signal generating element, normally disabled means responsive to echoes of said signal pulses, means for enabling said echo responsive means for a period of preassigned duration in response to application of a signal pulse to said enabling means, and means controlled by said control means for applying a signal pulse to said enabling means to initiate operation of said enabling means at a prescribed interval after each period of operation of said signal generating element.

4. An echo ranging system in accordance with claim 3 wherein said echo responsive means comprises register means operated in response to each echo received during the periods in which said echo responsive means is enabled.

5. In an echo ranging system including means for propagating time spaced signal pulses and means for detecting echoes of said pulses, a receiver for which said detecting means constitutes the input element, said receiver comprising a first electron discharge device having a control electrode normally biased beyond cut-off, a second electron discharge device having a control electrode normally biased beyond cut-off, impedance means in circuit with both said control electrodes effective in response to echoes received by said detecting means to overcome the bias upon said second control electrode, whereby said second device is rendered conductive, an output circuit for said second device, and means responsive to flow of current in said output circuit for short-circuiting said impedance means.

6. An echo ranging system comprising a signal projector, a source for energizing said projector, control means for operatively coupling said source to said projector for periods at preassigned intervals whereby signal pulses are propagated periodically by said projector, means responsive to echoes of said signal pulses including a receiver circuit, said receiver circuit including an electron discharge device having a first impedance bridged across the input circuit thereof and an indicating means controlled by said device, and means controlled by said control means for effectively short-circuiting said impedance for a period of preassigned duration after each period during which said source is operatively coupled to said projector.

7. An echo ranging system in accordance with claim 6 wherein said impedance comprises a first coil and said means controlled by said control means comprises a second coil in transformer relation with said first coil, a rectifier in circuit with said second coil and means for energizing said rectifier periodically.

8. An echo ranging system in accordance with claim 6 wherein said last-mentioned means comprises a unidirectionally conductive impedance coupled to said first impedance in effective bridging relation thereto, an electron discharge device having an output circuit in which said unidirectionally conductive impedance is included, said device including a control electrode normally biased to render the device conductive, and means for overcoming the bias upon said control electrode to render said device non-conductive periodically.

9. An echo ranging system in accordance with claim 6 wherein said first impedance includes a first coil and wherein said last-mentioned means comprises a second coil coupled in transformer relation to said first coil, a rectifier including four rectifier elements defining a bridge and poled to pass current between two conjugate corners of the bridge, said second coil being connected across the other two corners of the bridge, a second electron discharge device, the output circuit of which is connected to said conjugate corners, and means for blocking said second electron discharge device periodically.

10. An echo ranging system comprising a signal projector, energizing means therefor, control means for effecting energization of said projector for periods of prescribed duration at preassigned intervals, means including a receiver responsive to echoes of signals propagated by said projector, means for enabling said receiver for periods of preassigned duration, and means for initiating operation of said enabling means at a prescribed interval after each period of energization of said projector, said initiating means comprising a first electron discharge device having a control electrode normally biased to render the device non-conducting, a second electron discharge device having a control electrode and an anode, the control electrode circuit of said second device including a resistance which is included also in the anode circuit of said first device and such that when said first device is conducting the drop across said resistance biases said second control electrode beyond cut-off, means connected to said second control electrode and said control means for impressing upon said second control electrode a charge sufficient to overcome the bias thereon at the end of each energization period of said projector, a condenser coupling said anode of said second device to said control electrode of said first device and effective when charged to overcome the bias thereon, a resistance in circuit with said condenser of magnitude to effect discharge thereof at a predetermined rate fixing said prescribed interval, and means coupled to said anode for transmitting an enabling pulse to said enabling means at the end of said prescribed interval.

11. An echo ranging system comprising a signal projector, an energizing source therefor, electronic control means for effecting energization of said projector by said source for periods of prescribed duration at preassigned intervals, means responsive to echoes of signals propagated by said projector and including a receiver, electronic means for enabling said receiver for periods of preassigned duration, means for initiating operation of said enabling means at a predetermined time after each period of energization of said projector, said operation initiating means comprising an electrical circuit including a condenser resistance combination the discharge time of which fixes said predetermined time, means operated by said control means for charging said condenser, and means operative in response to discharge of said condenser for supplying a signal to said enabling means for initiating operation thereof.

12. An echo ranging system comprising a signal translating element operable both as a projector and as a detector, a source for energizing said element as a projector, a normally disabled receiver for which said element constitutes the input element, a first means for operatively associating said source with said signal translating element at time spaced periods of prescribed frequency and duration, a second means for enabling said receiver for a period of preassigned duration in response to a signal pulse applied to said second means, and a third means controlled by said first means for applying a signal pulse to said second means to initiate operation of said second means at a prescribed time after each period of energization of said signal translating element by said source.

13. A submarine echo ranging system comprising a compressional wave translating device operable as both a projector and a hydrophone, an oscillator, electronic control means for operatively associating said oscillator with said device at time spaced periods of preassigned duration and frequency and for producing a signal pulse at the end of each of said periods, a receiver for which said device constitutes the input element, electronic means for enabling said receiver for a period of prescribed duration in response to a signal supplied to the enabling means, and timer means responsive to said signal pulse for supplying a signal to said enabling means at a predetermined interval after reception of said signal pulse by said timer means.

References Cited in the file of this patent

UNITED STATES PATENTS

| | | |
|---|---|---|
| 2,003,992 | Cockrell | June 4, 1935 |
| 2,083,344 | Newhouse et al. | June 8, 1937 |
| 2,131,993 | Wittkuhns et al. | Oct. 4, 1938 |
| 2,225,046 | Hunter | Dec. 17, 1940 |
| 2,272,998 | Bjornson | Feb. 10, 1942 |
| 2,279,007 | Mortley | Apr. 7, 1942 |
| 2,346,093 | Tolson | Apr. 4, 1944 |
| 2,371,988 | Granqvist | Mar. 20, 1945 |